US005484879A

United States Patent [19]

Buchanan et al.

[11] Patent Number: 5,484,879
[45] Date of Patent: Jan. 16, 1996

[54] POLYIMIDES CONTAINING FLUORINE

[75] Inventors: Robert A. Buchanan; Jeffrey S. Stults, both of Grand Island; Ronald F. Spohn, Gettsville, all of N.Y.

[73] Assignee: Occidental Chemical Corporation, Niagara Falls, N.Y.

[21] Appl. No.: 628,750

[22] Filed: Dec. 17, 1990

[51] Int. Cl.[6] .............................. C08G 73/10; C08G 69/26
[52] U.S. Cl. .................. 528/353; 528/26; 528/28; 528/34; 528/38; 528/125; 528/128; 528/170; 528/171; 528/172; 528/173; 528/174; 528/176; 528/183; 528/185; 528/188; 528/220; 528/229; 528/350
[58] Field of Search ..................... 528/350, 353, 528/125, 128, 170, 171, 173, 172, 174, 183, 185, 188, 26, 28, 229, 176, 34, 220, 38

[56] References Cited

U.S. PATENT DOCUMENTS

| | | | |
|---|---|---|---|
| 2,710,853 | 6/1955 | Edwards et al. | 528/353 |
| 3,179,614 | 4/1965 | Edwards | 528/352 |
| 3,299,101 | 1/1967 | Tucker | 528/352 |
| 4,535,105 | 8/1985 | Inaike et al. | 528/229 |
| 4,760,126 | 7/1988 | Numata et al. | 528/352 |
| 4,820,791 | 4/1989 | Hergenrother | 528/353 |
| 4,874,835 | 10/1989 | Berdahl | 528/353 |
| 4,876,329 | 10/1989 | Chiang et al. | 528/188 |
| 4,912,197 | 3/1990 | Hayes | 528/353 |
| 4,990,670 | 2/1991 | Stults et al. | 564/417 |
| 4,996,278 | 2/1991 | Lee | 528/26 |
| 4,997,908 | 3/1991 | Lee | 528/353 |
| 5,003,086 | 3/1991 | Stults et al. | 549/241 |
| 5,021,540 | 6/1991 | Leone-Bay et al. | 528/183 |

FOREIGN PATENT DOCUMENTS 3490169  5/1985  Germany .

OTHER PUBLICATIONS

"The Synthesis of Some Trifluoromethyl Derivatives of p–Amino–benzoic Acid, Sulfanilamide and p,p'–Diphenyl Sulfone" [4,4'–thiobis [(3–trifluoromethyl)benzenamine & 4,4'–sulfonyl bis[(3–trifluoromethyl benzene amine]; Sayin et al, pp. 5125–5127, Journal of American Chemical Society vol. 73, Nov. 1951.

"Aromatic Fluorine Compounds VII Replacement of Aromatic –Cl and –NO$_2$ Groups–F[1,2]"–The Synthesis of 2,2'–bis–oxybis [(5–trifluoromethyl benzenamine] and 4,4'–oxybis[(3–trifluoromethyl)benzenamine] by Finger, et al, Journal of American Chemical Society, vol. 78, Aug., 1956, pp. 6034–6037.

Primary Examiner—P. Hampton-Hightower
Attorney, Agent, or Firm—Wayne A. Jones; Richard D. Fuerle

[57] ABSTRACT

Polyimide polymers of the following recurring structure and the corresponding polyamic acids are disclosed:

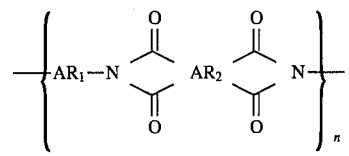

wherein $AR_1$ is

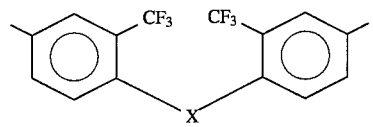

where X is O, S, SO, SO$_2$, CO, C(CF$_3$)$_2$, C(CH$_3$)$_2$, Si(CH$_3$)$_2$, or a single bond, wherein $AR_2$ may be pyromellitic dianhydride, a substituted pyromellitic dianhydride, naphthanoic dianhydride, or

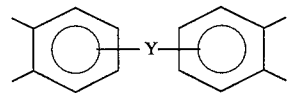

where Y is O, S, SO, SO$_2$, CO, C(CF$_3$)$_2$, C(CH$_3$)$_2$, Si(CH$_3$)$_2$ —O—AR—O—, or a single bond, where AR is an aromatic nucleus.

30 Claims, No Drawings

POLYIMIDES CONTAINING FLUORINE

BACKGROUND OF THE INVENTION

This invention relates to polyimide copolymers prepared by reacting of a mixture of dianhydrides with a diamine. More specifically, it relates to polyimide polymers prepared from diamines that contain the trifluoromethyl group.

Dianhydrides can be reacted with diamines to form polyimide resins. The formation of the polymer is a two step process. In the first step, the dianhydride reacts with the diamine to form a polyamic acid which generally remains in solution. The polyamic acid solution is then subjected to a curing process which may include heat. If heat is used the solvent evaporates, and the polyamic acid releases water to form the final polyimide. Chemical methods of curing are also available.

There are several methods for forming objects from polyimides. For example, the polyamic acid solution can be spread on a surface and cured to form a film. The surface need not be flat. Alternatively, the polyamic acid solution can be cured to form the polyimide which can then be subjected to heat and pressure to form objects.

Polyimides were first prepared by T. M. Bogert, et al. J. Am. Chem. Soc. 30, 1140 (1908).

U.S. Pat. No. 2,710,853 discloses polyimides based upon pyromellitic acid.

U.S. Pat. No. 3,179,614 discloses polyimides based upon organic diamines that contain aromatic groups bridged by oxygen, nitrogen, sulfur, silicone, and phosphorus.

U.S. Pat. No. 4,876,329 discloses polyimides based upon 3,5-diaminobenzotrifluoride and aromatic dianhydrides such as pyromellitic dianhydride, biphenyl dianhydride, diphenylether dianhydride, benzophenone dianhydride, 2,2-bis(3,4-dicarboxyphenyl)propane dianhydride and 2,2-bis(3,4-dicarboxyphenyl)dianhydride.

U.S. Pat. No. 4,760,126 discloses polyimides based upon fluorine containing diamines such as 2,2-bis[4-aminophenyl]hexafluoropropane with an extremely wide variety of dianhydrides.

The synthesis of 2,2'-oxy-bis[5-(trifluoromethyl)benzenamine] and 4,4'-oxy-bis[3-(trifluoromethyl)benzenamine] is disclosed in J. Am. Chem. Soc. 78, 6034 (1956). The synthesis of 4,4'-thio-bis[3-(trifluoromethyl)benzenamine] and 4,4'-sulfonyl-bis[3-(trifluoromethyl)benzenamine] are reported in J. Am. Chem. Soc. 73, 5125 (1958).

SUMMARY OF THE INVENTION

Polyimide polymers of the following recurring structure are disclosed:

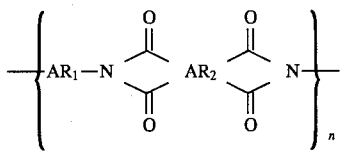

wherein $AR_1$ is represented by the following formula:

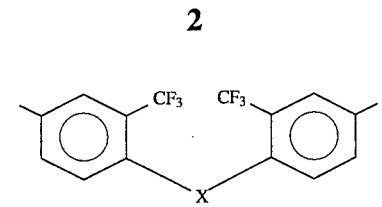

where X is O, S, SO, $SO_2$, CO, $C(CF_3)_2$, $C(CH_3)_2$, $Si(Me)_2$, a single bond,

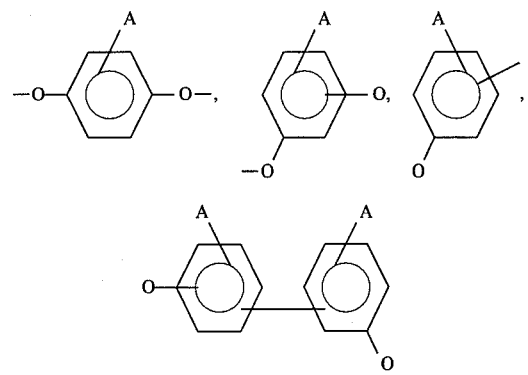

where Me is $CH_3$, A is H or $CF_3$, and wherein $AR_2$ is

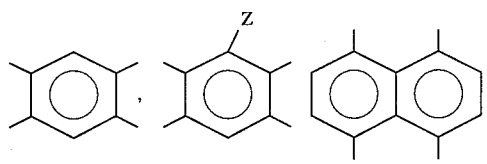

where Z is Cl, $NO_2$, $CF_3$, CN,

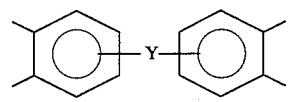

where Y is O, S, SO, $SO_2$, CO, $C(CF_3)_2$, $C(CH_3)_2$, $Si(Me)_2$, —O—AR—O—, or a single bond, and where AR is an aromatic nucleus.

DETAILED DESCRIPTION OF THE INVENTION

The polyimides of this invention have the following recurring structure:

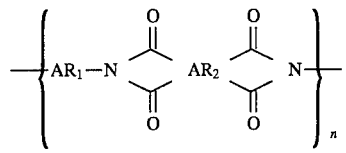

wherein $AR_1$ has the formula:

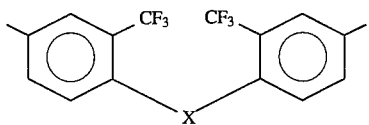

where X is O, S, SO, $SO_2$, CO, $(CF_3)_2$ C, $C(Me)_2$, $Si(Me)_2$,

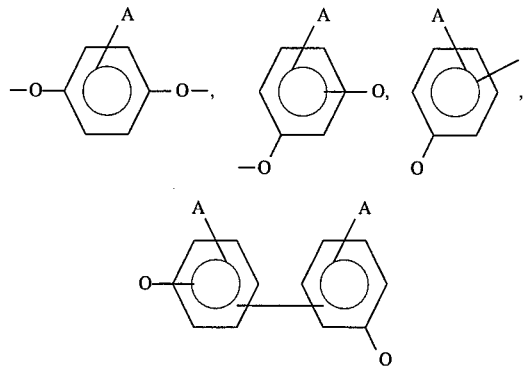

where A is H or $CF_3$ or a single bond, and wherein $AR_2$ is

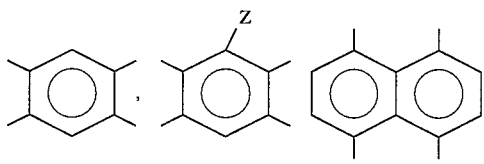

where Z is Cl, $NO_2$, $CF_3$, CN or has the formula:

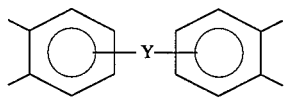

where Y is O, S, SO, $SO_2$, CO, $C(CF_3)_2$, $C(CH_3)_2$, $Si(CH_3)_2$, —O—AR—O—, or a single bond, where AR is an aromatic nucleus.

They are formed from amines of the following formula:

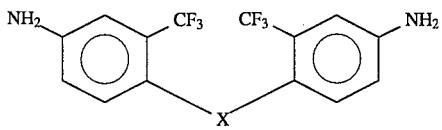

and where X is O, S, SO, $SO_2$, CO, $(CF_3)_2C$, $C(Me)_2$, $Si(Me)_2$, and dianhydrides, which can be a pyromellitic dianhydride, a substituted pyromellitic dianhydride, naphthalene tetracarboxylic dianhydride, or have the formula:

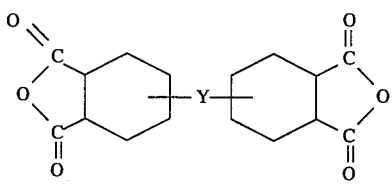

Among the diamines that are suitable for the use in the present invention are:

4,4'-Oxy-bis[3-(trifluoromethyl)benzenamine](1,2,4-OBABTF)
4,4'-Thio-bis[3-(trifluoromethyl)benzenamine]
4,4'-Sulfonyl-bis[3-(trifluoromethyl)benzenamine]
4,4'-Sulfoxyl-bis[3-(trifluoromethyl)benzenamine]
4,4'-Keto-bis[3-(trifluoromethyl)benzenamine]
4,4'-(2,2,2-trifluoromethyl-1-(trifluoromethyl)ethylidine)bis[3-(trifluoromethyl)benzenamine]
4,4'-dimethylsilyl-bis[3-(trifluoromethyl)benzenamine]

Among the dianhydrides that are suitable for use in the present invention are:

Bisphenol S dianhydride
Thio-diphthalic anhydride
Oxydiphthalic dianhydride (all isomers) (ODPA)
Symmetrical Biphenyl dianhydride
Un-symmetrical Biphenyl dianhydride
Pyromellitic dianhydride (PMDA)
Benzophenone tetracarboxylic dianhydride
Sulfonyl tetracarboxylic dianhydride
Resorcinol dianhydride
Bisphenol A dianhydride
(5,5'-[2,2,2-trifluoro-1-(trifluoromethyl)ethylidine]bis-1,3-isobenzofurandione) (6-FDA)

The polyimides of the present invention can be prepared by reacting the diamine component with the dianhydride to form polyamic acids that have the following recurring structure, wherein $AR_1$ and $AR_2$ are as defined above:

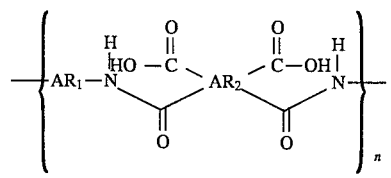

The polyamic acids are then treated to form the polyimide. In most cases equimolar amounts of diamine and dianhydride are used to form the polyamic acid. Occasionally, it is desirable to prevent the polyamic acid from becoming too viscous. Control of viscosity can be accomplished by using a slight excess of the diamine in the mixture to be polymerized. An acid anhydride such as phthalic anhydride may then be used as an end capping reagent. Alternatively, end capping can be accomplished by using an excess amount of dianhydride and using a monoamine such as aniline as an end capping reagent.

In the first step of the reaction, a single dianhydride is added to a solution of the diamine in a dipolar aprotic solvent. Illustrative of the dipolar aprotic solvents that can be used are dimethyl acetamide (DMAc), dimethyl formamide (DMF), dimethyl sulfoxide (DMSO), hexamethylphosphoramide (HMPA), N-methylpyrrolidone (NMP), and tetramethyl urea (TMU). The preferred solvent is dimethyl acetamide. The reaction between the diamine and the dianhydride is conducted at room temperature with stirring. The inherent viscosity of the polyamic acid solution is measured. Inherent viscosity is determined by measuring the viscosity of a 0.5% solution using a capillary viscometer. This viscosity is an indirect measure of the molecular weight of the polymer and, therefore, the extent of polymerization.

At this stage of the reaction, the product is a polyamic acid. The polyimides are formed by an imidization reaction.

For example, the polyamic acids can be poured into the desired form such as a plate. The polyamic acid is then subjected to curing. The initial step in curing is running a stream of an inert gas, such as nitrogen, over the formed polyamic acid in order to evaporate some of the solvent. When the formed polyamic acid is tack-free, it is then heated gradually from room temperature up to a maximum temperature of 400° C. or below. The temperature rise can be interrupted at intermediate temperatures and the object held at a given temperature before the temperature is allowed to increase to the maximum temperature. The preferred method is to allow the temperature to rise to 100° C., hold it at that temperature for one hour, allow the temperature to rise to 200° C., and hold it there for an hour, and, finally, to allow the temperature to rise to 300° C., and hold it at that temperature for an hour. There are three major changes that take place during the curing process. Most of the remainder of the solvent is lost, the polyamic acid releases water to form a polyimide, and chain extension takes place.

Alternatively, chemical imidization can be accomplished using a method such as that described by M. L. Wallach [Journal of Polymer Science, Part A-2; Vol. 6, 953–960 (1968)]. In this method the polyamic acid is heated with a mixture of an acid anhydride, such as acetic anhydride, and a tertiary amine, such as pyridine, as a basic catalyst. Wallach states that this method should yield a polyimide film which is essentially the same molecular weight as the polyamic acid. Other chemical imidization methods, similar to that disclosed by Wallach, can also be used.

The polyimides of this invention have good electrical properties and, accordingly, can be used as insulating material. The preferred method of using the polyimides of this invention as insulators is to coat an electrically conductive object to be insulated with the polyamic acid solution and cure the composition directly on the object to be insulated. By this means, the insulating layer of polyimide forms directly on the object to be insulated. The object to be insulated can be of any shape. For example, round wires, flat conductors, conductive sheets, circuit boards, and integrated semiconductor circuit chips can be insulated using the polyimides of this invention. Even objects of irregular shape can be insulated using these materials. Obviously, only those materials that can withstand the curing process can be insulated using the polyimides of this invention.

The dielectric constant and dissipation factor are measured using the method of ASTM D 150-87. In summary, the method involves measuring the capacitance of a polyimide layer when placed between two flat electrodes. A low dielectric constant is preferred in many electronic applications. This is especially true in applications that involve higher frequencies and higher circuit component densities. The lower the dielectric constant, the lower the capacity between closely placed insulated components. An insulator of low dielectric constant allows components to be placed closer together and allows the circuit to work at higher frequencies. Close component spacing and high frequency operation are particularly important in computers and similar devices.

Another important property of the polyimides of this invention is their low dissipation factor. The dissipation factor measures the amount of energy loss in the dielectric material of a capacitor. These losses show up as heat. Since the dissipation factor increases with increasing frequency, a low dissipation is important in high frequency, high density applications. The dissipation factor is measured by same test as for the dielectric constant (ASTM D-150-87).

Another important property is moisture regain, which is a measure of how much moisture a material absorbs from the air at different humidities. A lower moisture regain is important since the amount of moisture on a material has a strong effect on its electrical properties, such as the dielectric constant and dissipation factor. In addition, a low moisture regain permits use under a wider range of environmental conditions.

Another property of polyimides of this invention is good optical transparency. For example, per cent transmission of a 1 mil thick film to 500 nm light ranged from 70% to 88% with most values above 80%. Incorporation of fluorinated alkyl side chains into the backbone of the diamine moiety of these polyimides is responsible for this increased transparency.

Another property of polyimides of this invention is low flammability. The oxygen index is often used as a measure of flammability. To measure oxygen index, the polymer is exposed to a flame in atmospheres of various composition. The oxygen index is the percentage of oxygen that the atmosphere must contain in order for the polymer to support combustion. The higher the index, the less flammable the polymer.

The diamines used in the present invention all have the following structural features. The molecule is made up of two identical parts based upon a benzene ring linked together by a bridging atom or group. A $CF_3$ group is ortho to the bridge and the amino group is para to the bridge.

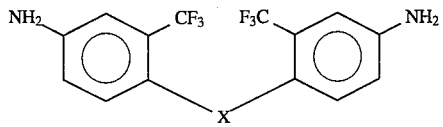

Although systematic nomenclature assigns the amine as position 1, and names these compounds accordingly, under the common convention, these molecules would be said to have a 1,2,4 arrangement. For example, in the structure above if X is O the systematic name for the molecule is 4,4'-oxy-bis[3-(trifluoromethyl)benzenamine]. The common name would be 4,4'-diamino-2,2'-bis(trifluoromethyl)diphenyl ether.

Diamines with a 1,2,4 linkage have unique and unexpected properties compared to other diamines that can be used in polyimides.

For example, polyimides prepared from extremely similar diamines with a 1,3,5 arrangement

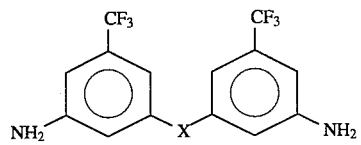

have slightly better electrical properties than do the similar polyimides prepared from 1,2,4 diamines. However, the 1,2,4 products are unexpectedly superior in tensile strengths, percent elongation, and upper temperature of use (as illustrated by the glass transition temperature, $T_g$). In addition, the 1,2,4 products have a slightly higher oxygen index and are therefore less flammable. When the 1,2,4 products are compared with polyimides prepared from 4,4'-oxydianiline it is found that the 1,2,4 products have a superior dielectric constant, a superior dissipation factor, a better oxygen index, and a lower moisture regain.

COMPARISONS WITH 1,3,5-OBABTF

The table below summarizes data on the characteristics of polyimides prepared from 1,2,4-OBABTF and various dianhydrides compared to polyimides prepared from the 5,5'-oxy-bis[3-(trifluoromethyl)benzenamine](1,3,5-OBABTF) using the same dianhydrides. The value for the 1,2,4 product is given first and the value for the 1,3,5 product is given second in each column.

|  | 6-FDA | ODPA | BPDA | BTDA |
|---|---|---|---|---|
| Tensile Strength (×1000 psi) | 16.3/13.0 | 16.4/15.9 | 19.5/13.6 | 17.4/15.5 |
| % Elongation | 12.8%/ 7.9% | 9.4%/ 4.7% | 9.0%/ 5.5% | 7.0%/3.7 |
| $T_g$ (°C.) | 295/230 | 255/210 | 290/240 | 265/225 |
| Oxygen Index | NA | 47.3%/ 45.3% | 53.6%/ 49.5% | 50.4%/ 47.3 |

COMPARISONS WITH 4,4'-oxydianiline (ODA):

The table below summarizes data on the characteristics of polyimides prepared from 1,2,4-OBABTF and various dianhydrides compared to polyimides prepared from the 4,4'-oxydianiline (ODA) and the same dianhydrides. The value for the 1,2,4 product is given first and the value for the ODA product is given second in each column.

|  | ODPA | BPDA | BTDA |
|---|---|---|---|
| Tensile Strength (×1000 psi) | 16.4/17.2 | 19.5/21.8 | 17.4/22.8 |
| $T_g$ (°C.) | 255/265 | 290/270 | 265/270 |
| Oxygen Index | 47.3%/35.8% | 53.6%/33.7% | NA |
| Moisture Regain | 0.54%/1.15% | 0.70%/0.80% | 0.70%/1.3% |
| Dielectric Constant (50% RH, 1 MHz) | 3.14/3.50 | 3.22/3.78 | 3.20/3.51 |
| Dissipation Factor (50% RH, 1 MHz, ×0.001) | 6.0/3.50 | 7.3/14.9 | 7.4/7.2 |

EXAMPLE 1

The typical procedure for preparing a polyimide from 1,2,4-OBABTF is illustrated with the dianhydride ODPA: 12.43 g ODPA was added to a stirred solution of dry dimethylacetamide (121.8 g) containing 13.48 g of the diamine 1,2,4-OBABTF. The solution was stirred at room temperature under a nitrogen atmosphere for 12 to 20 hours. After filtration, a portion of the resulting polyamic acid solution was spread on a glass plate with a doctor blade to give a 0.9 to 1.1 mil thick polyimide film after curing. The plate was placed in a dust-free chamber and warm nitrogen was passed over the plates until the film was no longer tacky. The plates were heated at a rate of 2° C. per minute and held at 100° C., 200° C., and 300° C. for 0.5 to 1 hour each. After cooling, the films were removed by soaking in warm to hot water. The cured film was transparent, tough, and light yellow in color. The $T_g$=255° C.; moisture regain (50% relative humidity) was 0.54%; oxygen index was 47.3%; thermal decomposition temperature of 549° C.; % transmission at 500 nm was 85%.

| Polyimide | Dielectric Constant | Dissipation Factor | Moisture Regain |
|---|---|---|---|
| 1,2,4-OBABTF/ ODPA | 3.20 (1 KHz) 3.14 (1 MHz) | 0.0027 (1 KHZ) 0.0060 (1 MHz) | 0.54% |

EXAMPLE 2

10.08 g 1,2,4-OBABTF, 9.66 g BTDA, and 123.3 g DMAc were used as described above to give a tough, transparent polyimide with a $T_g$=265° C., moisture regain (50% relative humidity) was 0.70%; oxygen index was 50.4%; thermal decomposition temperature of 539° C.; % transmittance at 500 nm was 70%.

| Polyimide | Dielectric Constant | Dissipation Factor | Moisture Regain |
|---|---|---|---|
| 1,2,4-OBABTF/ BTDA | 3.28 (1 KHz) 3.22 (1 MHz) | 0.0033 (1 KHZ) 0.0073 (1 MHz) | 0.70% |

EXAMPLE 3

10.01 g 1,2,4-OBABTF, 8.76 g BPDA, and 117.1 g DMAc were used as described above to give a tough, transparent polyimide with a $T_g$=290° C.; moisture regain (50% relative humidity) was 0.67%; oxygen index was 53.6%; thermal decomposition temperature of 563° C.; % transmittance at 500 nm was 78%.

| Polyimide | Dielectric Constant | Dissipation Factor | Moisture Regain |
|---|---|---|---|
| 1,2,4-OBABTF/ BPDA | 3.25 (1 KHz) 3.20 (1 MHz) | 0.0031 (1 KHZ) 0.0074 (1 MHz) | 0.67% |

EXAMPLE 4

6.86 g 1,2,4-OBABTF, 9.06 g 6-FDA, and 99.3 g DMAc were used as described above to give a tough, transparent polyimide with a $T_g$=295° C., moisture regain (50% relative humidity) was 0.53%; thermal decomposition temperature of 524° C.; % transmittance at 500 nm was 88%.

| Polyimide | Dielectric Constant | Dissipation Factor | Moisture Regain |
|---|---|---|---|
| 1,2,4-OBABTF/ 6-FDA | 2.78 (1 KHz) 2.76 (1 MHz) | 0.0010 (1 KHZ) 0.0043 (1 MHz) | 0.53% |

EXAMPLE 5

14.50 g 1,2,4-OBABTF, 9.41 g PMDA, and 112.0 g DMAc were used as described above to give a tough, transparent polyimide with a $T_g$=315° C., dielectric constant (1 MHz, 50% relative humidity) was 3.16; moisture regain (50% relative humidity) was 1.12%; thermal decomposition temperature of 548° C.; % transmittance at 500 nm was 80%.

| Polyimide | Dielectric Constant | Dissipation Factor | Moisture Regain |
|---|---|---|---|
| 1,2,4-OBABTF/ PMDA | 3.24 (1 KHz) 3.16 (1 MHz) | 0.0052 (1 KHZ) 0.0112 (1 MHz) | 1.12% |

COMPARATIVE EXAMPLE 1

The typical procedure for preparing a polyimide from 1,3,5-OBABTF is illustrated with the dianhydride ODPA: 11.69 g ODPA was added to a stirred solution of dry dimethylacetamide (76.1 g) containing 12.68 g of the diamine 1,3,5-OBABTF. The solution was stirred at room temperature under a nitrogen atmosphere for 16 to 24 hours. After filtration, a portion of the resulting polyamic acid solution was spread on a glass plate with a doctor blade to give a 0.9 to 1.1 mil thick polyimide film after curing. The plate was placed in a dust-free chamber and warm nitrogen was passed over the plate until the film was no longer tacky. The plates were heated at a rate of 2° C. per minute and held at 100° C., 200° C., and 300° C. for 0.5 to 1 hour each to effect imidization. After cooling, the films were removed by soaking in warm to hot water. The cured film was transparent, creasible, and tough. $T_g$=210° C., tensile strength=15,900 psi, % elongation=4.7%, and oxygen index=45.3%. By comparison, when 1,2,4-OBABTF was used as the diamine, $T_g$=255° C., tensile strength=16,400 psi, % elongation= 9.4%, and oxygen index=47.3%.

COMPARATIVE EXAMPLE 2

12.68 g 1,3,5-OBABTF, 11.69 g ODPA, and 76.1 g DMAc were used as described in comparative example 1 to give a tough, transparent polyimide with a $T_g$=210° C.; moisture regain (50% relative humidity) was 0.33%; oxygen index was 45.3%; thermal decomposition temperature of 548° C.; % transmittance at 500 nm was 84%.

| Polyimide | Dielectric Constant | Dissipation Factor | Moisture Regain |
|---|---|---|---|
| 1,3,5-OBABTF/ ODPA | 3.12 (1 KHz) 3.10 (1 MHz) | 0.0010 (1 KHZ) 0.0033 (1 MHz) | 0.33% |

COMPARATIVE EXAMPLE 3

9.20 g 1,3,5-OBABTF, 8.77 g BTDA, and 84.3 g DMAc were used as described in comparative example 1 to give a tough, transparent polyimide with a $T_g$=225° C., moisture regain (50% relative humidity) as 0.46%; oxygen index was 47.3%; thermal decomposition temperature of 536° C.; % transmittance 20 at 500 nm was 78%.

| Polyimide | Dielectric Constant | Dissipation Factor | Moisture Regain |
|---|---|---|---|
| 1,3,5-OBABTF/ ODPA | 3.03 (1 KHz) 2.99 (1 MHz) | 0.0017 (1 KHZ) 0.0052 (1 MHz) | 0.46% |

COMPARATIVE EXAMPLE 4

15.39 g 1,3,5-OBABTF, 13.40 g BPDA, and 90.0 DMAc were used a described in comparative example 1 to give a tough, transparent polyimide with a $T_g$=240° C.; moisture regain (50% relative humidity) was 0.44%; oxygen index was 49.5%; thermal decomposition temperature of 545° C.; % transmittance at 500 nm was 86%.

| Polyimide | Dielectric Constant | Dissipation Factor | Moisture Regain |
|---|---|---|---|
| 1,3,5-OBABTF/ BPDA | 3.15 (1 KHz) 3.13 (1 MHz) | 0.0009 (1 KHZ) 0.0045 (1 MHz) | 0.44% |

COMPARATIVE EXAMPLE 5

9.93 g 1,3,5-OBABTF, 13.11 g 6-FDA, and 86.2 g DMAc were used as described in comparative example 1 to give a tough, transparent polyimide with at $T_g$=230° C.; dielectric constant (1 MHz, 50% relative humidity) was 2.62; moisture regain (50% relative humidity) was 0.33%; thermal decomposition temperature of 518° C.; % transmittance at 500 nm was 88%.

| Polyimide | Dielectric Constant | Dissipation Factor | Moisture Regain |
|---|---|---|---|
| 1,3,5-OBABTF/ 6-FDA | 2.72 (1 KHz) 2.62 (1 MHz) | 0.0030 (1 KHZ) 0.0065 (1 MHz) | 0.33% |

COMPARATIVE EXAMPLE 6

9.20 g 1,3,5-OBABTF, 8.77 g BTDA, and 84.3 g DMAc were used as described in comparative example 1 to give a tough, transparent polyimide with $T_g$=225° C., tensile strength=15,500 psi, % elongation=3.7%, and oxygen index=47.3%. By comparison, when 1,2,4-OBABTF was used as the diamine, $T_g$=265° C., tensile strength=17,400 psi, % elongation=7.0%, and oxygen index =50.4%.

COMPARATIVE EXAMPLE 7

15.39 g 1,3,5-OBABTF, 13.40 g BPDA, and 90.0 g DMAc were used as described in comparative example 1 to give a tough, transparent polyimide with $T_g$=240° C., tensile strength-13,600 psi, % elongation=5.5%, and oxygen index=49.5%. By comparison, when 1,2,4-OBABTF was used as the diamine, $T_g$=290° C., tensile strength=19,500 psi, % elongation=9.0%, and oxygen index=53.6%.

COMPARATIVE EXAMPLE 8

9.93 g 1,3,5-OBABTF, 13.11 g 6-FDA, and 86.2 g DMAc were used as described in comparative example 1 to give a tough, transparent polyimide with $T_g$=230° C., tensile strength=13,000 psi, and % elongation=7.0%. By comparison, when 1,2,4-OBABTF was used as the diamine, $T_g$=295° C., tensile strength=16,300 psi, and % elongation= 12.8%.

COMPARATIVE EXAMPLE 9

80.09 g 4,4'-Oxydianiline (ODA), 124.70 g ODPA, and 1160 g DMAc were used as described in comparative example 1 to give a tough, transparent polyimide with dielectric constant (50% RH, 1 MHz)=3.50, dissipation factor (50% RH, 1 MHz)=0.0088, moisture regain=1.15% and oxygen index=35.8%. By comparison, when 1,2,4-OBABTF was used as the diamine, dielectric constant (50% RH, 1 MHz)=3.14, dissipation factor (50% RH, 1 MHz)= 0.0060, moisture regain=0.54% and oxygen index=47.3%.

COMPARATIVE EXAMPLE 10

84.10 g 4,4'-Oxydianiline (ODA), 135.33 g BTDA, and 1243 g DMAc were used as described in comparative example 1 to give a tough, transparent polyimide with dielectric constant (50% RH, 1 MHz)=3.78, dissipation factor (50% RH, 1 MHz)=0.0149, and moisture regain= 1.3%. By comparison, when 1,2,4-OBABTF was used as the diamine, dielectric constant (50% RH, 1 MHz)=3.22, dissipation factor (50% RH, 1 MHz)=0.0073, and moisture regain=0.70%.

COMPARATIVE EXAMPLE 11

34.03 g 4,4'-Oxydianiline (ODA), 50.00 g BPDA, and 480 g DMAc were used as described in comparative example 1 to give a tough, transparent polyimide with dielectric constant (50% RH, 1 MHz)=3.51, dissipation factor (50% RH, 1 MHz)= 0.0072, moisture regain=0.80% and oxygen index=33.7. By comparison, when 1,2,4-OBA-BTF was used as the diamine, dielectric constant (50% RH, 1 MHz)=3.20, dissipation factor (50% RH, 1 MHz)=0.0074, moisture regain=0.70%, and oxygen index=53.6%.

We claim:

1. A polyimide polymer consisting of the following recurring structure:

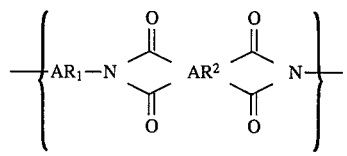

wherein $AR_1$ is

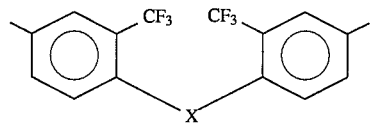

where X is O, S, SO, $SO_2$, CO, $C(CF_3)_2$, $C(CH_3)_2$, $Si(CH_3)_2$, or a single bond, wherein $AR_2$ is

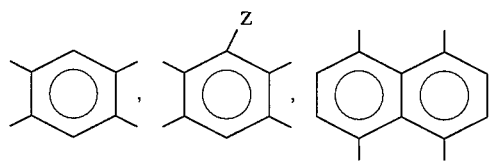

where Z is Cl, $NO_2$, $CF_3$ or CN; or

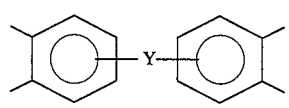

where Y is O, S, SO, $SO_2$, CO, $C(CF_3)_2$, $C(CH_3)_2$, $Si(CH_3)_2$ —O—Ar—O—, or a single bond, and where AR is an aromatic nucleus.

2. A polyimide according to claim 1 in which $AR_2$ is

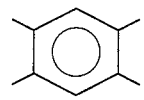

3. A polyimide according to claim 1 in which $AR_2$ is

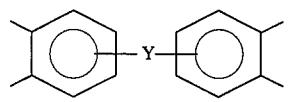

where Y is O, S, SO, $SO_2$, CO, $C(CF_3)_2$, $C(CH_3)_2$, $Si(CH_3)_2$ —O—Ar—O—, or a single bond, and where AR is an aromatic nucleus.

4. A polyimide according to claim 3 in which X and Y are both O.

5. A polyimide according to claim 3 in which X is O and Y is a single bond.

6. A polyimide according to claim 3 in which X is O and Y is $C(CF_3)_2$.

7. A polyimide according to claim 3 in which X is O and Y is $SO_2$.

8. A polyimide according to claim 3 in which X is O and Y is S.

9. A polyimide according to claim 3 in which X is O and Y is $C(CH_3)_2$.

10. A polyimide according to claim 3 in which X is O and Y is CO.

11. A polyimide according to claim 3 in which X is O and Y is —$Si(CH_3)_2$.

12. A polyimide according to claim 3 in which X is O and Y is —O—AR—O—.

13. A polyamic acid consisting of the following recurring structure:

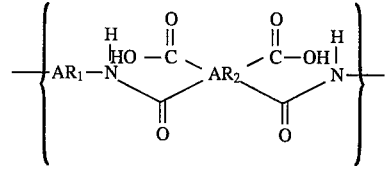

wherein $AR_1$ is

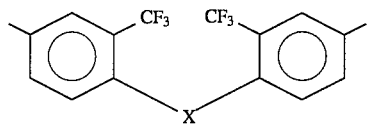

where X is O, S, SO, $SO_2$, CO, $C(CF_3)_2$, $C(CH_3)_2$, $Si(CH_3)_2$, or a single bond,
wherein $AR_2$ is

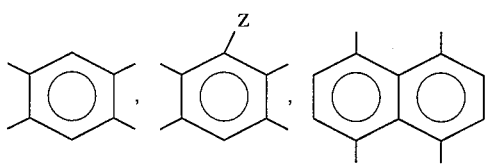

where Z is Cl, $NO_2$, $CF_3$ or CN; or

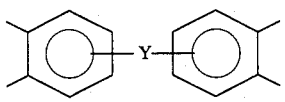

where Y is O, S, SO, SO$_2$, CO, C(CF$_3$)$_2$, C(CH$_3$)$_2$, Si(CH$_3$)$_2$ —O—AR—O—, or a single bond, and where AR is an aromatic nucleus.

14. A polyamic acid according to claim 13 in which AR$_2$ is

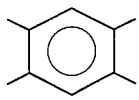

15. A polyamic acid according to claim 13 in which AR$_2$ is

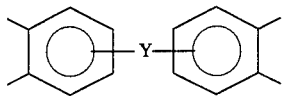

where Y is O, S, SO, SO$_2$, CO, C(CF$_3$)$_2$, C(CH$_3$)$_2$, Si(CH$_3$)$_2$ —O—AR—O—, or a single bond, and where AR is an aromatic nucleus.

16. A polyamic acid according to claim 15 in which X and Y are both O.

17. A polyamic acid according to claim 15 in which X is O and Y is a single bond.

18. A polyamic acid according to claim 15 in which X is O and Y is C(CF$_3$)$_2$.

19. A polyamic acid according to claim 15 in which X is S and Y is SO$_2$.

20. A polyamic acid according to claim 15 in which X is S and Y is S.

21. A polyamic acid according to claim 15 in which X is S and Y is C(CH$_3$)$_2$.

22. A polyamic acid according to claim 15 in which X is S and Y is CO.

23. A polyamic acid according to claim 15 in which X is S and Y is —Si(CH$_3$)$_2$.

24. A polyamic acid according to claim 15 in which X is S and Y is —O—AR—O—.

25. An object coated with a polyimide according to claim 1.

26. An object coated with a polyamic acid according to claim 13.

27. A polyimide made by reaction of a dianhydride having at least one aromatic ring in the molecule and 4,4'(2,2'-trifluoromethyl)oxydianiline.

28. A polyimide resin defined by claim 27 wherein the dianhydride is a member selected from the group consisting of pyromellitic dianhydride, 2,2-bis(3,4-dicarboxyphenyl)hexafluoropropane dianhydride, 3,3',4,4'-benzophenone tetracarboxylic dianhydride, 3,3',4,4'-oxydiphthalic anhydride, 3,3',4,4'-diphenyl tetracarboxylic dianhydride, and 3,3',4,4'-sulfonyldiphthalic anhydride.

29. A polyimide made by reaction of a dianhydride having at least one aromatic ring in the molecule and 4,4'(2,2"-trifluoromethyl)oxydianiline.

30. A polyimide resin defined by claim 29 wherein the dianhydride is a member selected from the group consisting of pyromellitic dianhydride 2,2-bis(3,4-dicarboxyphenyl)hexafluoropropane dianhydride, 3,3',4,4'-benzophenone tetracarboxylic dianhydride, 3,3',4,4'-oxydiphthalic anhydride, 3,3',4,4'-diphenyl tetracarboxylic dianhydride, and 3,3',4,4'-sulfonyldiphthalic anhydride.

* * * * *